United States Patent [19]
Tersch et al.

[11] 3,762,006
[45] Oct. 2, 1973

[54] PROGRESSIVE CUTTING BROACH WAFERS

[75] Inventors: Richard W. Tersch, Grosse Pointe Woods; Stewart F. Miller, Mt. Clemens, both of Mich.

[73] Assignee: Lear Siegler Inc., Santa Monica, Calif.

[22] Filed: July 11, 1972

[21] Appl. No.: 270,677

[52] U.S. Cl. ............................................. 29/95.1 R
[51] Int. Cl. ............................................. B26d 1/00
[58] Field of Search ............................ 29/95, 95.1

[56] References Cited
UNITED STATES PATENTS

| | | | |
|---|---|---|---|
| 3,553,909 | 1/1971 | Tersch | 29/95.1 |
| 3,022,710 | 2/1962 | Kopec | 29/95.1 |
| 2,674,780 | 4/1954 | Nielsen | 29/95.1 |
| 772,841 | 10/1904 | Smith | 29/95.1 |
| 2,304,185 | 12/1942 | Lee | 29/95.1 |

*Primary Examiner*—Harrison L. Hinson
*Attorney*—Donald P. Bush

[57] ABSTRACT

A rigid broach ring for assembly with a multiplicity of similar broach rings to form a pot broach, in which the teeth of the broach ring are arranged so that not all of the teeth initiate their cut on the work piece simultaneously. Preferably, the teeth are provided into two or more groups spaced symmetrically about the ring with the teeth in each group stepped axially of the ring so as to come into initial cutting contact with the work sequentially.

12 Claims, 4 Drawing Figures

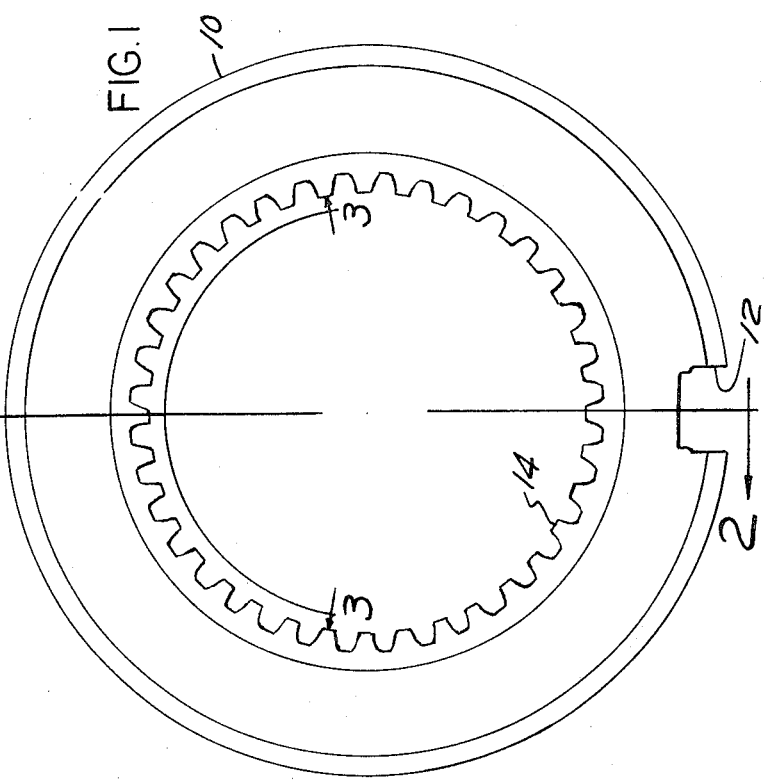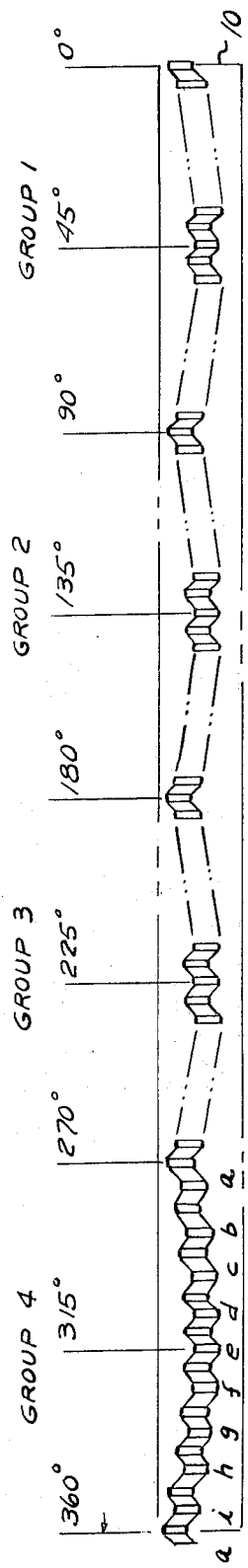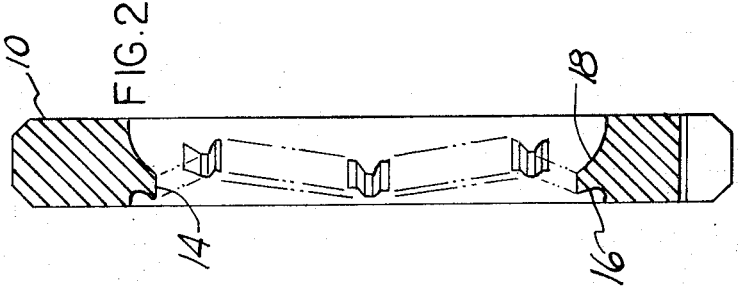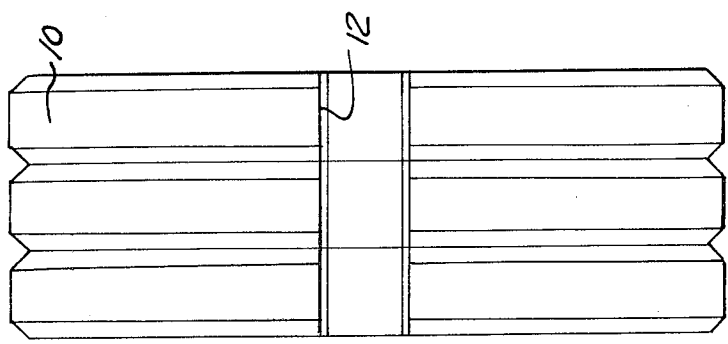

PROGRESSIVE CUTTING BROACH WAFERS

BRIEF SUMMARY OF THE INVENTION

Broaching machines for broaching externally toothed members such as external gears employ an elongated tubular broaching tool assembly in which the individual cutting teeth of the broaching tool extend radially inwardly of the assembly.

As disclosed in Psenka U.S. Pat. No. 3,332,129, a pot broach may be assembled from a multiplicity of broach rings or wafers, each of which is provided with a single circumferentially extending row of teeth. The teeth in adjacent wafers are longitudinally aligned. If the broach is intended to broach spur gears this alignment of teeth in consecutive wafers is along a line parallel to the axis of the broach. If the broach is designed for broaching helical gears, the longitudinal alignment of teeth in successive broaches extends helically around the broach assembly. Herein, either case is considered to provide the broach teeth in longitudinal alignment.

If the teeth of the broach wafers in each ring have the cutting edges located symmetrically with respect to a plane radial of the assembly, then all of the broach teeth in each wafer contact the work simultaneously. This has the tendency to produce a shock when each ring of broach teeth engages the work and tends to induce chatter and produce irregularities in the broach teeth.

In prior Anthony application, Ser. No. 132,834 there is disclosed an arrangement in which the individual wafers of a pot broach are flexed so as to dispose the teeth in an arrangement in which the teeth come into action successively or progressively. However, this arrangement does not provide the flexibility of design inherent in the construction disclosed herein, and in addition, involves some problems in the proper formation of the cutter teeth so as to provide the theoretically correct form when the ring is flexed in assembly.

In accordance with the present invention, rings or wafers for the pot broaching tool assembly are rigid and the teeth of each ring is disposed to be in longitudinal alignment with corresponding teeth in adjacent rings. In order to provide the sequential initiation of cutting action, the location of the cutting teeth in each ring as measured axially of the ring is such as to produce an improved sequential cutting operation.

Since the ribs are rigid, it is possible to provide relative axial displacement between and among the teeth in substantially any desired pattern. As one extreme, alternate teeth of each ring or wafer have cutting edges identically located with respect to a radial plane, whereas the remaining teeth have cutting edges identically located with respect to a second radial plane displaced axially of the ring or wafer from the first mentioned plane.

At the other extreme, which is not preferred in a practical embodiment of the invention, is an arrangement in which all of the teeth of the rings or wafers are disposed on a continuous 360° helix. This provides the maximum sequential cutting but is subjected to the objection that the initiation of cuts is not provided in a balanced manner around the ring or wafer, and the further disadvantage that it requires a maximum thickness of ring or wafer to accommodate spacing of each cutting tooth therein with reference to each other cutting tooth.

Preferably, the cutting teeth are arranged in groups located symmetrically circumferentially of the wafer, with the teeth in each group disposed in a particular pattern to produce a desirable symmetrical cutting operation.

BRIEF DESCRIPTION OF THE DRAWING

FIG. 1 is a plan view of a broach ring or wafer constructed in accordance with the present invention.

FIG. 2 is a sectional view on the line 2—2, FIG. 1.

FIG. 3 is a developed elevational view throughout 360°, the view being taken in the direction of the arrows 3—3, FIG. 1.

FIG. 4 is a fragmentary view illustrating three of the broach rings in a sub-assembly.

DETAILED DESCRIPTION

The broach rings or wafers 10 adapted to be assembled in coaxial relation and in firm side-to-side abutment in a holder, may be identical except for the stepped relationship of the broaching teeth. This of course is the conventional arrangement of broach teeth in which each longitudinally extending series of teeth starts with a relatively low or relatively narrow tooth and the successive teeth are of increasing height or width until the last few teeth of each longitudinal series are of a size adapted to cut the corresponding tooth space of the work piece to full depth and/or width and to final shape. Each of the broach rings or wafers 10 is provided with a locating recess 12 which is positioned with great accuracy with respect to the cutting teeth 14. Thus, when a series of wafers are assembled together as suggested in FIG. 4, the recesses 12 together define an elongated locating slot or groove which is adapted to receive a key, as disclosed in the Psenka patent, so that the teeth of all of the assembled wafers may be brought into accurate longitudinal alignment by the provision of a locating key received in the slot or groove formed by the recesses 12.

As best suggested in FIG. 2, each of the wafers is of a width such that the wafer itself is perfectly rigid, the opposite sides of the wafer being flat surfaces brought into full surface-to-surface contact as suggested in FIG. 4, and firmly clamped in such position.

In order to produce the sequential cutting action, the individual teeth 14 of each wafer are not disposed symmetrically with respect to a plane radial of the wafer. Instead, the teeth are arranged so that they come into cutting engagement with a work piece progressively or sequentially.

The foregoing arrangement of teeth may be considered as limited in one case by an arrangement in which alternate teeth are disposed symmetrically with respect to a first plane radial of the wafer while the remaining teeth are disposed symmetrically with respect to a second plane radial of the wafer and displaced axially thereof from the first plane. With this arrangement, alternate teeth of the broach contact the work piece simultaneously and the remaining teeth contact the work simultaneously shortly after engagement of the first teeth, upon a cutting stroke between the pot broach assembly and a work gear. The other locating condition may be considered as one in which all of the teeth of each wafer are disposed in a continuous helical path so that cutting action is initiated progressively from one tooth to the next tooth in one direction completely around the wafer.

Preferably, the teeth of each wafer are divided into a plurality of groups disposed symmetically around the wafer and the teeth of each group are arranged to come into action sequentially. Moreover, corresponding teeth in each group are located to come into action or to initiate cutting action simultaneously. With this arrangement, not only is the impact of a rigid number of teeth avoided, but forces acting between the broach assembly and the work piece are located symmetrically about the axes of the work piece and broach, a factor which contributes to accuracy of the finished work piece.

Referring now particularly to FIGS. 1–3, it will be observed that FIG. 3 is a developed view of all of the teeth of the broach wafer 10 viewed from the interior as indicated by the arrows 3—3. It will be observed in FIG. 3 that these teeth are disposed in what may be considered as four groups; namely, the group extending from 0° to 90° designated as group 1 as indicated on the drawing; the second group extending from 90° to 180° designated as group 2; the third group extending from 180° to 270° designated as group 3; and the fourth group extending from 270° to 360° or back to 0° designated as group 4. This grouping of teeth is also suggested in FIG. 2 although not as clearly illustrated. All of the teeth in the fourth group extending from 270° to 360° in FIG. 3 are illustrated and comprise ten teeth identified in FIG. 3 as $a$, $b$, $c$, $d$, $e$, $f$, $g$, $h$, $i$, and $a$, the teeth $a$ being considered as in both groups, the broach wafer illustrated in FIG. 1 having 36 teeth. Preferably, teeth $a$–$e$ are uniformly stepped axially of the broach wafer 10. Moreover, the teeth $e$ through $i$ to $a$ are similarly stepped, and teeth $a$ are spaced axially from the teeth $e$ and $f$ by equal distances, as are teeth $b$ and $i$, teeth $c$ and $h$, and teeth $d$ and $g$. Thus, in each of the groups 1–4, upon initiation of cutting action by relative movement between the broach wafer 10 and a work piece in a cutting stroke, the first contact between the broach wafer and a work piece will be simultaneous contact of a set of all teeth corresponding to the teeth $e$ and $f$ in group 4. Upon further relative movement between the broach and work piece simultaneous contact between all of the teeth corresponding to the teeth $d$ and $g$ occurs, followed by consecutive contact of all of the teeth corresponding to teeth $c$ and $h$, and then teeth $b$ and $i$, and finally teeth $a$. The amount of axial displacement between teeth of a single broach wafer is substantially exaggerated in FIGS. 2 and 4 and the amount of displacement between the most nearly related teeth may be only a few thousandths of an inch. The amount of axial displacement is of course only required to be sufficient to produce an effective sequential or progressive cutting action.

Instead of arranging all of the teeth in four groups, it will be appreciated that the teeth may be divided into two groups, three groups, or five or more groups.

Instead of providing all of the teeth in each group at a uniform axial displacement as illustrated in FIG. 3, the teeth in each group may be disposed in a curved array as viewed radially of the broach.

The essential feature of the present invention is an arrangement of teeth which may be predetermined as to pattern.

It is of course recognized that all of the teeth, although provided with back taper or cutting clearance as is conventional in broaches, must be identical and this requires that while the foremost teeth $e$ and $f$ of each group are located substantially ahead of the teeth $a$ in this group, and that while all of these teeth require the same back taper or cutting clearance, the face or effective profile of these teeth must be identical and moreover, must be identical to the cutting face of all cutting teeth in the wafer. In other words, all of the teeth on each wafer are identical in configuration and in alignment with respect to the wafer, and differ only in relative axial displacement therebetween. This may be readily accomplished in grinding the teeth.

In FIGS. 1 and 3 no effort is made to show the precise shape of the cutting teeth, but this is evident from FIG. 2 where the teeth 14 are seen to have front rake as indicated at 16, top clearance, and a back slope as indicated at 18. In other words, the teeth 14, except for their relative axial displacement on each broach wafer, are identical with standard or conventional broach teeth.

Viewed somewhat differently, it may be said that the teeth of the different groups may be divided into sets and that each of the sets is axially spaced from adjacent sets by substantially equal amounts. Thus, in group 4 the teeth $e$ and $f$ may be considered to constitute a set, the teeth $d$ and $g$ may be considered to constitute a second set, the teeth $c$ and $h$ may be considered to constitute a third set, etc. Also, the teeth in each of the groups are identically arranged so that from another point of view, all of the teeth $e$ and $f$ in the several sets may be considered to constitute a set, all of the teeth $d$ and $g$ in the several groups may be said to constitute a second set, etc. In either case, the axial spacing between axially adjacent sets is preferably substantially equal so as to produce a uniform action with a ring having a minimum axial dimension.

Since all of the teeth of a single broach ring are required to cut identical spaces, it will be appreciated that the cutting edge or edges of each tooth must have the same effective profile, which may be considered as the profile of the cutting edge or edges of the teeth in the direction of movement. This of course means that the actual profile of the side of each tooth may differ from the effective profile as defined herein due to the combination of front hook or rake on the tooth and the back-off provided at the sides thereof. Accordingly, the tooth or teeth on each ring which occupies the most forwardly extending position will be identical in effective profile and in alignment or orientation with respect to the ring with the teeth occupying the rearmost position.

What we claim as our invention is:

1. A pot broach wafer in the form of a rigid ring having a multiplicity of broach teeth projecting radially inwardly of said ring, a first multiplicity of said teeth being symmetrically located with respect to a first plane perpendicular to the axis of said ring, and a second multiplicity of teeth being symmetrically located with respect to a second plane perpendicular to the axis of said ring and spaced axially of said ring from said first plane.

2. A wafer as defined in claim 1 in which all of the teeth of each ring are identical in configuration and alignment.

3. A wafer as defined in claim 1 in which said teeth are arranged in circumferentially consecutive groups, and the teeth in each group are arranged with substantially the same pattern of relative axial displacement.

4. A wafer as defined in claim 3 in which said teeth are arranged such that different sets of teeth come into cutting engagement with a work piece after substantially equal increments of relative axial movement between the wafer and a work piece.

5. A wafer as defined in claim 4 in which said teeth are arranged to provide for cuts to be initiated progressively circumferentially by adjacent teeth.

6. A wafer as defined in claim 1 in which the entire circumference of the ring is divided up into groups of substantially equal circumferential extent, and the teeth are arranged such that substantially equal numbers of teeth in each group come into cutting operation simultaneously.

7. A wafer as defined in claim 6 in which the teeth in each group are divided into sets, all of the teeth of each set being disposed in circumferential alignment, and all of the sets having substantially the same axial displacement from adjacent sets.

8. A wafer as defined in claim 1 in which all of the teeth being divided into sets in which all of the teeth in corresponding sets are in circumferential alignment, and in which the teeth of each set is spaced axially from the teeth of adjacent sets by substantially equal amounts.

9. A wafer as defined in claim 8 in which the teeth of each set are equally spaced circumferentially of the wafers.

10. A tool for simultaneously cutting a multiplicity of circularly arranged gear tooth surfaces in a direction longitudinally of the teeth from one end thereof to the other, said tool comprising a body having a circularly arranged series of teeth having cutting edges defined by the intersection between an end surface of each tooth and the sides thereof, said body having teeth positioned with the said cutting edges spaced different distances from a plane perpendicular to the axis of said tool to initiate cutting action at different times during a cutting stroke in a direction parallel to the axis of said cutter.

11. A tool as defined in claim 10 in which teeth are spaced from said plane to initiate cuts at points spaced symmetrically around the circular array of teeth to provide a balance of cutting force.

12. A tool as defined in claim 11 in which teeth are spaced progressively circumferentially and axially of the tool to provide a progression of initiation of cutting action circumferentially of the tool.

* * * * *